Aug. 19, 1958   T. OPUSZENSKI   2,847,678
SYSTEM FOR CONTROLLED ACTUATION OF AN ARTIFICAL HAND
Original Filed July 24, 1951   7 Sheets-Sheet 1

FIG. 1

INVENTOR
THEODORE OPUSZENSKI
BY *John C. Dorfman*
ATTORNEY

FIG. 2

Aug. 19, 1958  T. OPUSZENSKI  2,847,678
SYSTEM FOR CONTROLLED ACTUATION OF AN ARTIFICAL HAND
Original Filed July 24, 1951  7 Sheets-Sheet 3

INVENTOR
THEODORE OPUSZENSKI
BY John C. Dorfman
ATTORNEY

Aug. 19, 1958     T. OPUSZENSKI     2,847,678

SYSTEM FOR CONTROLLED ACTUATION OF AN ARTIFICAL HAND

Original Filed July 24, 1951     7 Sheets-Sheet 4

INVENTOR
THEODORE OPUSZENSKI
BY John C. Dorfman
ATTORNEY

Aug. 19, 1958 T. OPUSZENSKI 2,847,678
SYSTEM FOR CONTROLLED ACTUATION OF AN ARTIFICAL HAND
Original Filed July 24, 1951 7 Sheets-Sheet 5

INVENTOR
THEODORE OPUSZENSKI
BY *John C. Dorfman*
ATTORNEY

Aug. 19, 1958  T. OPUSZENSKI  2,847,678
SYSTEM FOR CONTROLLED ACTUATION OF AN ARTIFICAL HAND
Original Filed July 24, 1951  7 Sheets-Sheet 6

INVENTOR
THEODORE OPUSZENSKI
BY John C. Dorfman
ATTORNEY

Aug. 19, 1958 T. OPUSZENSKI 2,847,678
SYSTEM FOR CONTROLLED ACTUATION OF AN ARTIFICAL HAND
Original Filed July 24, 1951 7 Sheets-Sheet 7

INVENTOR
THEODORE OPUSZENSKI
BY
ATTORNEY

United States Patent Office 2,847,678
Patented Aug. 19, 1958

2,847,678

SYSTEM FOR CONTROLLED ACTUATION OF AN ARTIFICIAL HAND

Theodore Opuszenski, Glenbrook, Conn.

Original application July 24, 1951, Serial No. 238,336, now Patent No. 2,669,727, dated February 23, 1954. Divided and this application January 15, 1954, Serial No. 404,297

12 Claims. (Cl. 3—12.7)

This invention concerns a new type artificial hand which is muscle actuated and controlled and which so simulates the mechanical movements of the human hand that its user is able to accomplish many of the same actions with his artificial hand that he could accomplish with a real hand and in substantially the same manner in which such movement would be made.

It is a primary object of my invention to provide an artificial hand which may be made to look like a real human hand and, at the same time, which is useful to accomplish many everyday tasks. Prior art artificial hands are, for the most part, either ornamental or useful, but not both ornamental and useful. Even the more recently developed hands which are claimed to be both useful and natural in appearance are limited in their usefulness, and look natural only to the casual observer when the hand is at rest. By way of contrast, my novel hand appears natural while in motion as well as while at rest. For example, my hand has three-segment digits which bend in a natural way at three joints. Likewise, the manner of bending my artificial thumb, which swings through a large arc about a near-hand knuckle at a large angle with the near-hand finger knuckles, amounts to a particularly significant advance. This large arc swing of the thumb together with correct finger movement permits my hand to grasp larger objects than has been heretofore possible with artificial hands. Likewise, the thumb and forefinger or middle finger of my hand are actually opposed so that objects may be grasped firmly therebetween.

It is also an object of my invention to cause actuation of my artificial hand in a natural way. Rather than using a natural muscle connection requiring surgery, such as a pin piercing a forearm muscle, and rather than using a relatively easily operated means relying upon unnatural movement of some sort for actuation of the hand, my invention employs a simple switch which may be closed by the flexing of those muscles which would normally move the hand. Thus, actuation is accomplished with a minimum of effort in a movement which is undetectable to the most careful observer. This type of actuation also makes it possible to learn to use the artificial hand in a minimum of time because it is possible in many cases to use the same muscle movements in actuating the artificial hand as those used by a person in moving his real hand.

Another object of my invention is to produce an artificial hand which is powerful, yet controllable. My power supply includes a fluid pressure storage means which permits the rapid build up of fluid pressure, which in turn is used to drive the hand movement mechanism. Thus, if the hand is otherwise made strong enough, it is possible to crush a tin can with my artificial hand. By contrast, a release valve is provided which may be used at any time to partially or fully release the pressure so that with practice the wearer should be able to control the pressure of the digits in grasping and thus be able to handle fragile objects without breaking or crushing them.

Still another object of my invention is to produce a rugged artificial hand capable of withstanding a great amount of mechanical battering. The design of my digits makes it possible to use heavy guage materials at almost all points in the fabrication of the digits, and the shapes of the digital members further add to their strength. Likewise, the drive means and the digital coupling, one digit to another and to the power supply, is of rugged construction and quite simple design. In general, the use of fragile components has been avoided in my artificial hand.

Yet another object of my invention is to provide a compact artificial hand. My hand is unusually compact in that all power supply and drive means may be included in the hand itself, below the wrist. Only the socket and support members, the actuating switches, and the energy supply (usually batteries) are outside of the hand. Nevertheless, my artificial hand is not bulky or unnatural in appearance, and no parts of my artificial hand protrude to interfere with its operation in any way.

It is another object of my invention to make my artificial hand light. Lightness is of great importance because a heavy hand, no matter how theoretically useful, cannot be moved about with ease and natural movement. My artificial hand is extremely light. Most of its parts, particularly the parts of the digits and the drive mechanism, can be made of light metals or possibly even of plastics. The natural compactness of my hand makes for lightness, and its simplicity eliminates a great many weight-adding pieces.

Many other advantages of my invention will be evident from the discussion hereafter. For a better understanding of my invention reference is made to the following drawings.

Figure 1:
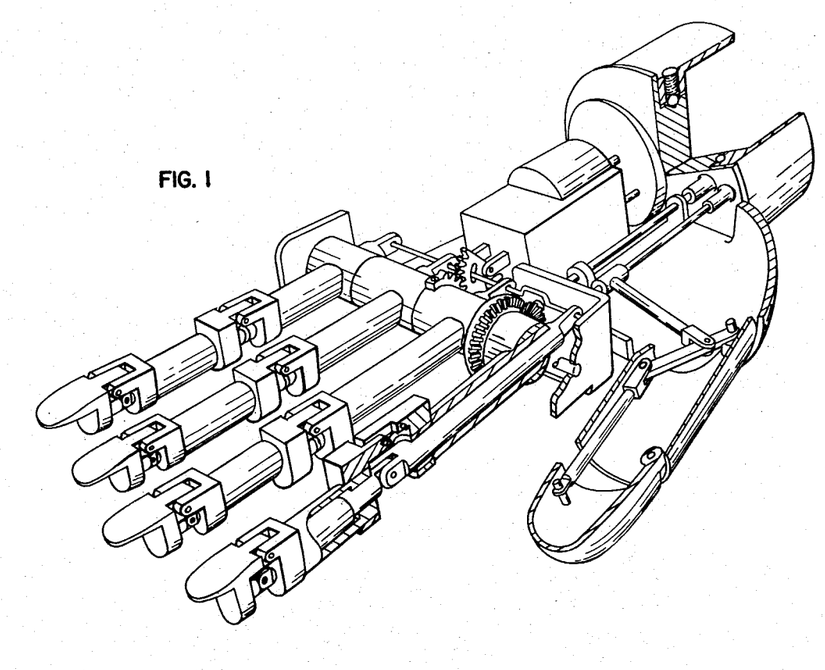
Fig. 1 shows a perspective view of a preferred construction of my artificial hand partially in section.

Referring to Fig. 1, my novel artificial hand mechanism is shown as a whole, up to and including the wrist, but without socket or support means. The relative simplicity and ruggedness of this structure is immediately apparent. Its relative simplicity makes it possible to make this hand both light and compact without sacrificing power. Its lightness is important because it lessens the load which the amputee wearer must lift. Its compactness permits the light, compact power supply unit to be advantageously located within the hand itself. Thus a complete operational mechanism is included within the hand below the wrist without telltale bulk or weight so that only the energy source need be located outside of the hand. Hence, my hand is particularly valuable for a wrist level amputee. However, it is an advantage of my hand that it may be adapted for use no matter at what level the amputation occurs.

The structure illustrated in Fig. 1 may be affixed to any known type of support or socket. Many methods of attachment of the hand of the present invention will occur to one skilled in the art. When the actuation means for driving closed and releasing the artificial hand is electrically powered, as in the case of the structure illustrated in Fig. 1, the necessary energy source may consist of batteries which may be carried in any convenient location on the body of the wearer. The actuation means may be switches which close the power supply circuits respectively in which the motor drive and the solenoid release are found. These switches may be closed in any desired manner but preferably are closed in response to the flexing of muscles which would normally cause movement of the hand.

Figure 2:
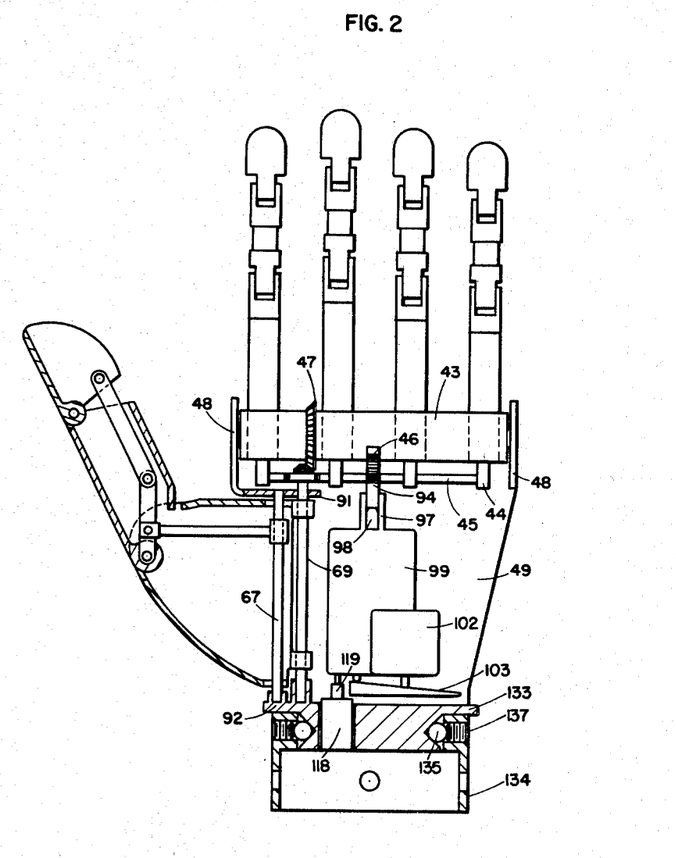
Fig. 2 illustrates my hand partially in section from above.

Fig. 2 shows a preferred arrangement for my artificial hand designed to produce efficient movement of all the parts and, at the same time, to minimize the necessary parts without sacrificing power or ease of movement. This drawing will be referred to from time to time in the following discussion.

Figure 3:
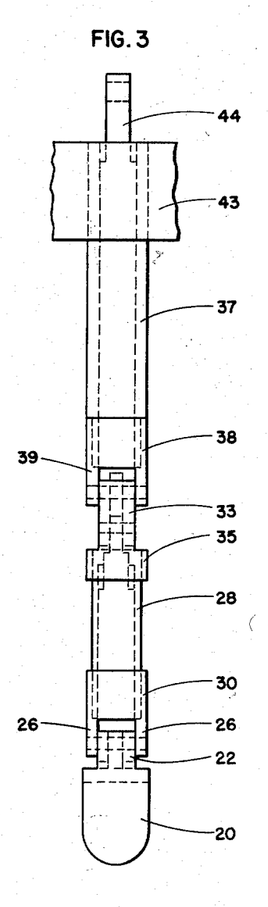
Fig. 3 shows an elevational view of one finger from above.
Figure 4:
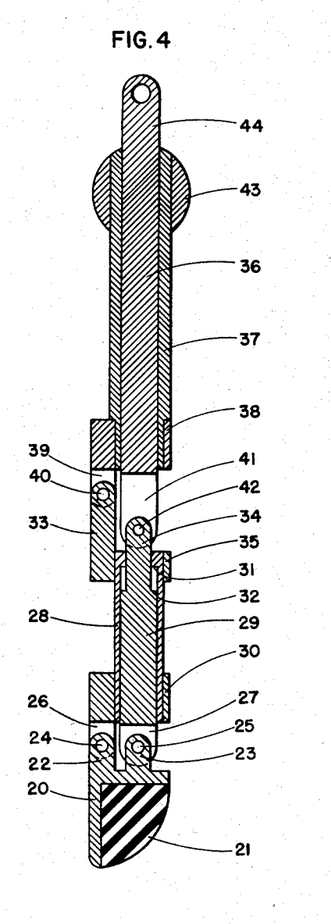
Fig. 4 shows in section a side view of the same finger.

Figs. 3 and 4 show in detail the preferred construction of artificial fingers for use with my artificial hand. Although the segment dimensions and the overall size of each finger may differ from one to another in the same hand and from hand to hand, the construction of each of the four fingers is advantageously mechanically the same. Like the real human finger, but unlike many prior art artificial digits, these fingers each have three segments which I prefer to term the tip, middle and near-hand segments. Near-hand is used in the sense of being near the palm of the hand.

The tip segment 20 is mechanically a single piece, but it may have a contacting surface 21 made of resilient material, such as rubber, in order to simulate the give found in the touch of real fingers. A pair of tongue flanges 22 and 23 extend from the tip segment 20 toward the middle segment and form the means whereby the tip segment is joined to the respective members of the middle segment.

Parallel pins 24 and 25 connect flanges 22 and 23 to the forked flanges 26 and 27 respectively, the prongs of which forked flanges lie on two sides of flanges 22 and 23. The forked flange 26 is connected to middle segment member 28 while forked flange 27 terminates middle segment member 29. Flange 26 may be affixed to member 28 in any appropriate manner such as by collar 30 which may be welded or otherwise permanently attached to member 28. Members 28 and 29 are coaxial, member 28 being tubular and surrounding member 29. While the members 28 and 29 are independent of one another, in that they are not attached in any way, member 29 fits close within member 28, thereby restricting relative movement between segment members to that in the direction of their elongation. A radial shoulder 31, formed by the reduction of the inner diameter of tubular member 28, opposes radial shoulder 32, formed by the reduction of the diameter of member 29. Flanges 33 and 34, extending toward the near-hand segment, terminate the near-hand end of the middle segment members 28 and 29 respectively. Flange 33 may be connected to member 28 by a collar 35. Flange 34 is an extension of the member 29.

The near-hand segment of the finger is composed of member 36 coaxially surrounded by tubular member 37. These members correspond to the middle segment members 29 and 28. A collar 38, similar to collar 30 used to connect flange 26 to member 28, may be used to affix fork-like flange 39 to member 37. Pin 40 joins flanges 33 and 39. Forked flange 41, an extension of member 36, is connected to flange 34 by pin 42 which is parallel to pin 40. The near-hand end of tubular member 37 terminates in knuckle member 43 which may advantageously be a cylindrical or tubular member through which member 37 passes at right angles thereto. Member 36 is advantageously extended beyond the member 37 and the knuckle 43 and terminated in a flange portion 44 which lies primarily on the opposite side of the knuckle from the rest of the digit.

The connection means 24 and 25, and 40 and 42 have been referred to as parallel pins. Another coupling means, the mechanical equivalent of a pin, may be substituted for any pin provided it permits relative rotation of the coupled parts about an axis corresponding to the pin.

Many variations are possible in the shape or arrangement of the extension members or flanges which make possible the rotatable connection of members in the adjacent segments. For instance, fork and tongue flanges may be interchanged.

Figure 5:
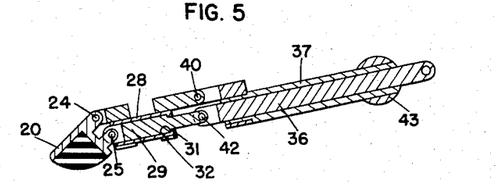
Fig. 5 illustrates, in a sectional view, the movement of the finger of Figs. 3 and 4 and specifically shows the tip segment fully bent.
Figure 6:
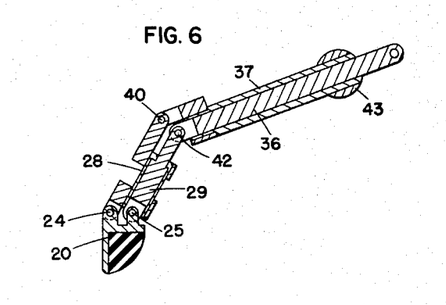
Fig. 6 illustrates, in a sectional view, the finger of Figs. 3 and 4 in essentially the position that it would occupy in a closed hand.

Finger movement is illustrated in Figs. 5 and 6. Finger movement is caused by the application of parallel opposing forces to the near-hand segment members 36 and 37 in the direction of their elongation. These parallel forces usually appear in the form of a force causing the relative withdrawal of member 36 toward the palm of the hand while the other force tends to hold member 37 in place or to cause its relative movement in the direction opposite that of member 36. Because of the rotatable connections at 42 and 25, the withdrawal of member 36 will cause a withdrawal of middle segment member 29 and tend to cause a withdrawal of tip segment 20. Tip segment 20 cannot be withdrawn, however, because it is also rigidly, though rotatably, connected by pin 24 to member 28 which in turn is connected by pin 40 to the relatively stationary near-hand segment member 37. Thus, when pin 25 is withdrawn, the opposition to withdrawal presented at pin 24 will produce rotation of tip 20 about pin 24. The change in the position of tip 20 is accomplished by relative rotation between tip member 20 and middle segment member 29.

Rotation of tip segment 20 relative to the middle segment will continue until the relative movement between the middle segment members is stopped. Thus, the amount of bending of the tip segment 20 may be controlled by limiting the amount of relative motion between middle segment members 28 and 29. This relative motion is limited by opposing shoulders 31 and 32 on members 28 and 29 respectively.

When shoulders 31 and 32 abut, no further relative withdrawal of member 29 is possible. Therefore, the middle segment members 28 and 29 will react as a unit, not unlike the tip segment, to forces tending to produce such a withdrawal movement. Thus, the withdrawal of member 36 will tend to cause withdrawal of the whole middle segment because of connection 42. However, the near-hand member 37 will tend to prevent withdrawal of the middle segment because of connection 40. The opposition to the withdrawal of the middle segment will therefore produce rotation about pin 40. This rotation is accompanied by relative rotation between middle segment member 29 and near-hand segment 36.

It will be apparent that when rotation of the tip segment 20 relative to the middle segment takes place around pin 24, pin 25 tends also to rotate around pin 24. Likewise, when rotation of the middle segment relative to the near-hand segment takes place around pin 40, pin 42 tends also to rotate around pin 40. In each of these instances complete rotation of one pin around the other is obviously impossible, if for no other reason than because the pivot which tends to rotate about the other is the one which connects the inner members of the segments. In fact, the confining nature of tubular outer members 28 and 37 would seem to limit inner members 29 and 36, hence the pins affixed to them, to motion along lines parallel to the direction of elongation. However, the relative bending between digital segments is seldom more than 30°. For such small angles, the chord differs very little from its arc of the circle described in bending. The effect of the arc is minimized by placing the pins so that the chord of the arc is essentially parallel to the direction of elongation. Then the important component of motion will always be parallel to the direction of motion with minor components of motion perpendicular to this direction and reversing in direction midway between the unbent and the fully bent portions of the particular joint. As a practical matter, this means that pin 25 is advantageously placed ahead (further from the palm of the hand) of pin 24 in the direction of elongation of the middle segment when the tip segment is unbent. By the same token for ideal positioning, pin 25 should be as far behind pin 24 in the fully bent position as it is ahead in the unbent position. Likewise, pin 42 should be as far ahead of pin 40 in the direction of elongation of the near-hand segment when the middle segment begins to bend relative to the near-hand segment as it is behind pin 40 when the middle segment is fully bent. This joints presents an additional problem, however, as the inner member 29 of the middle segment, including pin 42, must move in this same direction even before relative bending between the middle and near-hand segments begins. Thus pin 42 is advantageously placed so that its arc around pivot 40 begins when pivot 42 is as far ahead of pin 40 in the direction of elongation of the near-hand segment as it is behind pin 40 when fully bent. It should also be noted that only small distances are involved between the pins relative to the length of the segments.

Although the perpendicular component of relative motion between inner and outer segment members may be minimized as above described, very close tolerances between the respective members of each segment and between the various pins and the members which they penetrate will prohibit any motion perpendicular to the direction of elongation of these segments. Thus, in my artificial hand looseness or play is intentionally left either in the pin connection or between the members of a segment. If the play is left at the connections, it is advantageously done by affixing the pin permanently to one member and enlarging the hole through which it passes in the other member.

It may also be noted in passing that the ends of flanges are advantageously rounded to insure complete freedom in rotational movement, particularly where the flanges are short and overlap one another for a large part of their length.

Figures 7, 10:
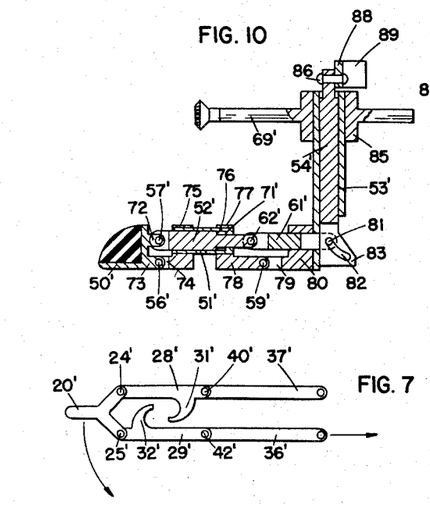
Fig. 7 shows a simplified finger structure of my invention which illustrates the principle of operation of my artificial digits.
Fig. 10 illustrates in a sectional view from above a modified form of my artificial thumb.

Fig. 7 shows the most simplified version of my artificial digit and demonstrates the basic operation and structure of my artificial digit. While this simple construction or a modification thereof might be employed in lieu of the more complicated structure above described, it lacks the strength and self-protecting qualities of the coaxial construction. Nevertheless, it serves to illustrate the basic simplicity of my artificial finger.

As before mentioned, like the human finger, my artificial finger has three segments. The tip segment 20' is advantageously composed of a single, somewhat elongated member. The middle segment and the near-hand segment are each composed of the rigid essentially parallel, elongated members 28' and 29', and 37' and 36' respectively. Each of the middle segment members 28' and 29' is joined at one end to the tip segment 20' by pin means 24' and 25' permitting rotation. The opposite end of each middle segment member 28' and 29' is connected to the corresponding member 37' and 36' in the near-hand segment by pins 40' and 42' respectively.

To cause the finger of Fig. 7 to bend, the near-hand segment members 36' and 38' are acted upon by which forces tend to withdraw one member (36') relative to the other and along a line parallel to the other. Withdrawal of member 36' will cause member 29' to be withdrawn also because of the connection therebetween. Likewise, tip segment 20', because of its connection 25' to member 29', will tend to be withdrawn, but the connection 24' and, in turn, the rigid members 28' and 37', will tend to oppose withdrawal. These opposing forces are able to cause rotation of tip 20' about pin connection 24', however, because pin connection 25' also permits rotation or bending of tip 20' relative to the other middle segment member 29' which must remain essentially parallel to member 28'.

Tip segment 20' will continue to rotate about connection 24' as long as connection 25' is withdrawn or as long as the relative movement between parallel members 28' and 29' continues. The amount of relative movement between members 28' and 29' is limited by opposing stop members 31' and 32' which are affixed to members 28' and 29' respectively. When these members abut, there can be no further relative withdrawal of member 29' with respect to member 28'. Thus, the spacing between stop members 31' and 32' will determine the amount of parallel relative movement between members 28' and 29' and hence the amount of rotation of the tip segment. Since it is usually desirable to limit the bending of the tip segment to approximately 30°, this spacing between the stop members should be very small. The location of these stop members, like their shape, is only by way of illustration. As illustrated in Fig. 7 their spacing is greatly exaggerated.

When the stop members 31' and 32' abut, since further relative movement in the same direction is impossible, the middle segment then will act as a single piece similar to the tip segment as member 36' is further withdrawn. Thus, withdrawal of pin member 36' causes withdrawal of connection 42' and, due to the rigidity of member 37', produces rotation of the whole middle segment about pin 40'. The middle segment will bend until the withdrawal of member 36' is stopped.

It may be seen that when a tubular member is used to surround a rod-like member as in Figs. 3 and 4, the parallelism of the two members is enforced. Likewise parallelism may be enforced by closely surrounding one of the parallel members of Fig. 7 with a portion of the other member or some member rigidly affixed to the other member. However, the coaxial construction is preferred as it adds strength to the digital unit and protects the movement of the inner-member from interference with material used to cover the finger mechanism. Nevertheless, any digital unit which may grow out of the simple configuration illustrated in Fig. 7 is within the scope of my invention.

If a rotational movement about the near-hand end of members 36' and 37' is superimposed on the linear relative movement of members 36' and 37', the bending of the near-hand knuckle in a real hand will be simulated. This rotational movement is easily and effectively imposed upon the fingers in the Figs. 3 and 4 preferred version of my artificial finger by cylindrical knuckle member 43. In this version of the artificial finger, tubular outer member 37 passes through cylindrical knuckle member 43 at right angles thereto. Thus rotation of knuckle 43 simultaneously causes an effective rotation of the whole finger, including the inner near-hand segment member, with other bending operations previously described as is illustrated in Figs. 5 and 6.

Since the rotation of the knuckle member 43 produces a bending of the whole finger relative to the palm of the hand, it is necessary to make a connection to member 36 about which member 36 may rotate and through which the force causing its withdrawal may be supplied. This member may be a shaft 45 parallel to the knuckle 43. In the preferred coaxial construction of Figs. 3 and 4, the rotation of the knuckle 43 and withdrawal of the inner member 36 is caused by this means. Rotational movement is advantageously supplied to the knuckle by a gear connection to the drive. The shaft connection to end flange 44 of member 36 is placed in a cam slot. If there is rigid connection between the knuckle and the member in which the cam slot is formed, as the knuckle is rotated, the shaft, hence member 36, will be withdrawn as the knuckle is rotated.

Figure 8:
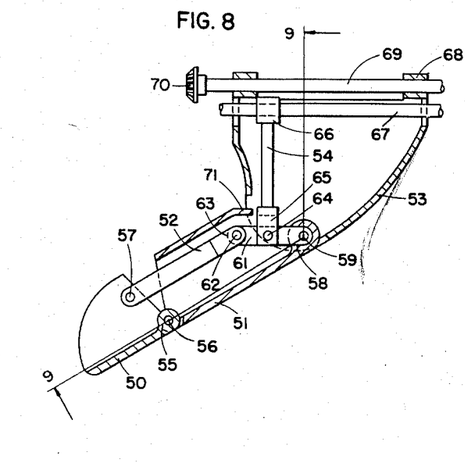
Fig. 8 shows a cross sectional view from above of one form of my artificial thumb.
Figure 9:
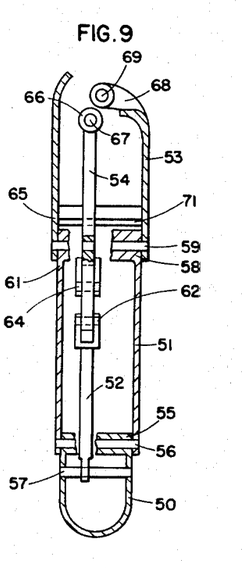
Fig. 9 shows a sectional view of the same thumb taken along line 9—9 of Fig. 8.

If the finger should not be of coaxial construction, even simpler means of withdrawal are possible. For instance, the knuckle and the shaft may be fixed to the hand in such a way that the near-hand segment member joined to the knuckle is effectively rotated away from the shaft. As the member joined to the knuckle moves away from the shaft, the member connected to the shaft moves closer to the knuckle. The connection to the middle segment member on that near-hand member which is connected to the hand by the shaft necessarily also moves closer to the knuckle. Thus, effective withdrawal of this near-hand and middle segment connection as well as the subsequent members is accomplished, causing the finger to bend in the same way that it does when moved by other means. Such a system of withdrawal of one member relative to the other at the near-hand knuckle is illustrated in Figs. 8 and 9 wherein it is employed with a thumb of my invention. The system will be explained in detail in connection with the discussion of the structure and operation of the thumb of Figs. 8 and 9.

For the simple grasping movements most commonly required in every day living, simultaneous movement of all the fingers is sufficient. This may be accomplished by using a single cylindrical member for the near-hand knuckle member 43 through which a member of the near-hand segment of each of the four fingers passes, advantageously at right angles thereto. Similarly, by coupling one end of each of the members corresponding to 36 (the end being designated 44) to the same member, simultaneous withdrawal of all these members may be accomplished. A shaft member 45 having portions perpendicular to each of the extension parts designated 44 where it penetrates each of said extensions may be used to accomplish this end. As seen in Fig. 1, the shaft may be made with bends in it in order to avoid collision between it and other parts.

The thumb unit as pictured in Fig. 8 and Fig. 9 is in many respects similar to the fingers previously described. A finger within the scope of my invention might be made using the general type of construction shown for this type of thumb. As pictured, the thumb is composed of a tip segment 50, a middle segment consisting of a tubular member 51 surrounding a rod-like member 52 and a near-hand segment consisting of member 53 of an essentially tubular shape and rod-like member 54. A boss 55 on the tip segment adjacent member 51 furnishes an appendage which fits within member 51 and enables pin 56 to connect members 50 and 51. A simple pin connection 57 may be made between tip 50 and middle segment member 52. A boss 58, similar to boss 55, is formed on member 51 and fits within member 53, thus enabling pin connection 59 between these two members.

The thumb differs from the finger in that it employs an intermediate member between one member of the middle segment and the corresponding member of the near-hand segment, usually the inner member of these segments. In Figs. 8 and 9, rod-like member 61 serves in this capacity and is also rotatably connected, in this case, by pin 59 which joins it to the tubular members of the middle and near-hand segments. Member 61 is pin connected to inner middle segment member 52 at its other end by pin 62 which passes through said member 61 and through the yoke extension 63 of member 52. A pin 64 at an intermediate point long rod 61 connects inner near-hand segment member 54 to member 61 by means of yoke extension 65 at the end of member 54. The opposite end of member 54 terminates in boss 66 which is penetrated by shaft 67 and thereby pin connected to the palm of the hand. Member 53 is given rotational movement at its near-hand end where it is connected by boss 68 to knuckle member 69. The knuckle member may be supplied power through gear 70.

Thumb movement occurs as the rotation of knuckle 69 causes near-hand tubular member 53 to rotate. This rotational movement also causes rod-like member 54 to rotate about shaft 67. Although rotation occurs about both knuckle 69 and shaft 67, the relative position of shaft 67 and knuckle 69 remains the same. On the other hand, as near-hand segment member 53 rotates, its pin connection 59 becomes further removed from shaft 67 and, by the same token, pin connection 64 to the inner near-hand segment member 54 more closely approaches knuckle member 69. This change in relative position amounts effectively to the withdrawal of pivot 64 relative to the outer near-hand and middle segment members. This means, here used for producing bending of the thumb, will be recognized as the same means that was generally described as an alternative way to produce bending in the finger.

The effective pull on pin 64 causes member 61 to rotate about pin 59 and to produce a pull through pin 62 upon middle segment member 52. The resultant pull on pin 57 tends to produce a withdrawal of tip segment 50, but the rigid outer member of the middle and near-hand segments 51 and 53 through their connections 56 and 59 oppose such withdrawal. As a result, rotation of the tip segment 50 occurs about pin 56. Tip segment 50 will continue to rotate about pin 56 until the movement of rod 52 is stopped by stop member 71. In this instance, the stop member 71, which limits the relative movement between the middle segment members, is merely a shoulder on the tubular member 51 against which either member 52 or member 61 will come to rest. Thereafter, the whole middle segment and the bent tip segment 50 will rotate as a whole about pin 59 under the pull exerted upon pin 64.

Figure 11:
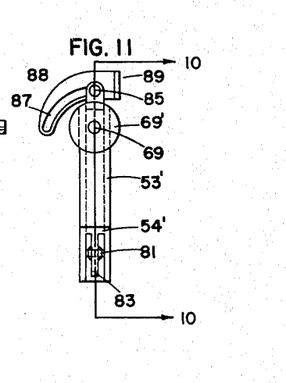
Fig. 11 shows the Fig. 10 thumb construction in a side elevational view.

Figs. 10 and 11 show a modified thumb structure which corresponds to the preferred construction of the finger. Here again, a tip member 50' is pivotally connected through parallel pins 56' and 57' to independent middle segment members 51' and 52'. Member 51' is tubular and coaxially surrounds member 52'. The near-hand segment is composed of coaxial tubular member 53' surrounding member 54'. Flanges 72 and 73 on tip segment 50' are used to connect the tip segment to its adjacent segment. The middle segment has a collar 75 surrounding member 51' supporting a yoke flange 74 extending toward and lying on two sides of flange 73 through which is made the pin connection 56'. Stop means in the middle segment is formed by opposed radial shoulders 76 and 71' formed on members 52' and 51' respectively. A collar 77 surrounds the end of member 51' adjacent the near-hand segment and supports flange 78. Cooperating forked flange member 79 is affixed to near-hand segment member 53' at right angles thereto through collar 80. A connection member between the adjacent ends of the inner middle and near hand segment members 52' and 54' is furnished by member 61'. Member 61' is connected at one end to member 52' by pin 62'. The opposite end of member 61' is advantageously terminated in a yoke through which passes pin 81 which rides in cam slot 82 formed in plate 83, an extension of member 54'. Cam slot 82 curves away from the middle segment as it approaches the end of the near-hand segment. A knuckle 85, affixed to the near-hand end of near-hand member 53', is an enlarged portion of shaft member 69'.

This Figs. 10 and 11 type of thumb operation is basically like that of the Figs. 8 and 9 thumb, but in some ways it resembles more closely the finger movements of the construction of Figs. 3–6. Shaft 69' imparts rotational movement through knuckle member 85 to the tubular outer near-hand member 54'. Since it is coaxially contained by member 53', rod-like member 54' rotates with member 53' and in so doing is withdrawn by pin 86, a connection through its near-hand end, which pin rides in cam slot 87. Slot 87 is formed in member 88 which is affixed to hand palm member 49 through flange 89. The withdrawal of member 54' causes the withdrawal of its extension flange 83 in which is formed the cam slot 82. As member 54 is withdrawn, it causes the withdrawal of member 61' at right angles to the direction of withdrawal of member 54' because of the pull exerted on pin 81 which rides in cam slot 82 and because collar (or tubular extension) 80 restricts the motion of member 61' to the direction of its elongation. Withdrawal of member 61' causes the withdrawal of middle segment member 52' because of pin connection 62'. Withdrawal of member 52' tends to cause withdrawal of tip segment 50'. Withdrawal of the tip 50' is impossible because of rigid opposition by the outer members of the middle and near-hand segments. However, the force acting through pivot 57' ultimately produces bending of tip 50' about pin 56'. Bending of the tip 50' and withdrawal of middle segment member 52' continues until shoulder 76 of middle segment member 52' and shoulder 71' of tubular member 51' abut. Thereafter rotation of the whole middle segment as a unit will take place around pin 59' due to the continued withdrawal of member 61' which will cease when pin 81 can move no further in cam slot 82 (or until pin 86 can move no further in cam slot 87). It may be noted that pin 81 and pin 86 may also be called shafts in the same sense that shaft 45 is called shaft (see Fig. 2).

It should be noted that particularly in the thumb, the near-hand segment need not be perpendicular to the knuckle. It is made so in Figs. 10 and 11, but it may just as readily be made at another angle as in the Figs. 8 and 9 construction. It is also true of the middle and near-hand segments that they may be placed at any angle desired, right angles being usually the most convenient relative positioning.

It should also be noted that members 61 and 61' together with their connections to other members serve as connection means between corresponding near-hand and middle segment members in Figs. 8 and 9 and Figs. 10 and 11 respectively. This member, as may be seen from these two examples, may differ in form, but it always has the effect of changing the direction of motion from one segment to the other.

The drive mechanism, the means causing the bending of the fingers and thumb, may be seen in Figs. 1 and 2. It is pictured from above in Fig. 2 and is partially illustrated in greater detail in the side, partially sectioned view of Fig. 12. As previously mentioned, each of the fingers could be individually actuated, but, for the purposes of most users, it is sufficient to have simultaneous bending of the fingers and thumb. In my hand, I prefer to use a gear connection between the thumb and finger knuckles as a means of coupling these members together so that they may be driven by the same power supply means acting either on the thumb or the finger knuckles. Thus, only one power supply output means is necessary to drive my hand.

Figure 12:
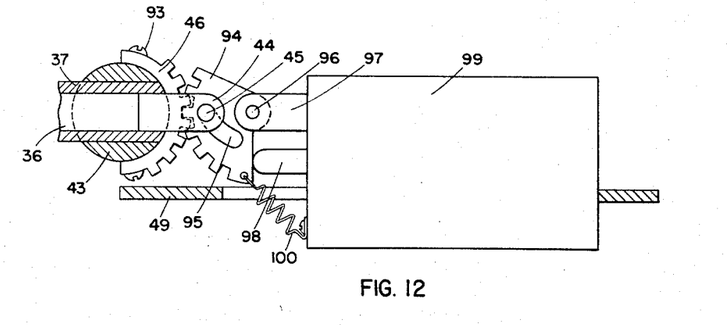
Fig. 12 shows in partial section the drive coupling means used in the preferred form of my invention to drive the artificial hand.

The meshing of bevel gears 47 and 70 makes possible the rotation of the thumb at some angle, preferably right angles, to the axis of rotation of the fingers along knuckle 43. This rotation of thumb and finger knuckles at right angles simulates the movement of a normal human hand. Prior artificial hands have disregarded the fact that bending of the thumb occurs about a near-hand knuckle at a large angle with the finger knuckles. The thumb swings through a large arc which is provided for by choosing a proper gear ratio between finger and thumb knuckles such that the thumb closes two or three times faster than the fingers. Closing of the hand is completed for grasping most small objects by the meeting of the tips of the thumb and the first and/or second fingers. The thumb tip 50 would not meet the finger tips in a natural manner were the axes of bending at the joints between the tip and middle segment and between the middle and near-hand segments parallel to the axis of rotation provided by shaft 69. To prevent the thumb from closing directly across the palm of the hand, it is well to provide the joints between the tip and middle segments and joints between the middle and near-hand segments with axes of bending whose perpendicular planes are always perpendicular to the planes perpendicular to shaft 69 the joint between the palm and the near-hand segment. It is not essential that these perpendicular planes be actually perpendicular, but they should preferably be at angles of between 45° and 90°. It is also interesting to note that should the near-hand segment of the thumb be rotated 90° with respect to its open position shown, the connections between the tip and middle segments and the middle and near-hand segments of the thumb should then be essentially parallel to the corresponding connections in the fingers. In such position, the bending of the thumb and fingers will be in opposite directions, hence toward each other, which accounts for the superior grasping ability of my hand. Even relatively large objects, in the order of size of a baseball or larger may be grasped by my hand, whereas they could not be naturally grasped, if at all, by prior art hands. The wide swing of the thumb permits the closing of the hand upon such relatively large objects in picking them up whereas prior art hands would have to rely primarily upon wedging effects.

As previously described, the near-hand segment member 36 is withdrawn, while member 37 is rotated in order to produce finger bending. All four fingers are rotated about knuckle 43 and the members corresponding to 36 are simultaneously withdrawn by the withdrawal of shaft 45 which joins them. Shaft 45 may have bends in it, as previously mentioned, as long as those portions penetrating end portions 44 of member 36 are parallel to knuckle 43. Rotational movement may be imparted to knuckle 43 by gear member 46 held in place against knuckle 43 by screws 93 or other means, which gear has the same center of rotation as knuckle 43. Gear member 94 has teeth which oppose and mesh with those of gear 46. A cam slot 95 is cut in gear 94 and through this cam passes shaft 45. A cam slot might otherwise be cut in any member rigidly connected to palm 49. The pin 96 connects gear 94 and flange member 97 which is advantageously affixed to the power unit housing 99 which is, in turn, rigidly affixed to palm 49. Rotational movement of gear 94 about pin 96 is caused by the advance of member 98 which is coupled to the power supply output means. The rotation of gear 94 in turn causes rotation of gear 46, hence knuckle 43. Movement of the cam slot 95 as well as the movement of member 36 changes the position of shaft 45 in the cam slot 95. This change in position produces a withdrawal of shaft 45 and all members attached thereto. The drive unit is rigidly affixed to the hand palm portion 49. Thus, palm portion 49 is rigidly, though pivotally, connected to knuckle and shaft elements. This rigid connection to the palm, and hence to each other, provides a path from shaft to knuckle through which the opposing forces causing finger movement may be transmitted.

The amount of finger bending is limited by the length of the cam slot 95. When rod 45 strikes the end of the slot, further withdrawal of member 36 is not possible. In order to prevent an undue load from being imposed upon the gear member 94 at either end of the cam slot 95, it is possible to include reinforced stop members at the various fingers joints or knuckles so that the full load of forces tending to cause further bending, or even straightening, of the digits will not have to be borne by shaft 45 or slot 95. Although such stop means are not shown, they may be incorporated in my hand in any appropriate way. A spring means 100, or other tensioning means, may be used to oppose the movement of the gears and to assure the return of the hand to its open position upon release of the forces acting upon member 98. Tension may also be applied to the individual digits so that they will tend to return to their open position. However, it must be remembered that such loading makes it that much more difficult to cause bending of the fingers.

Figure 13:
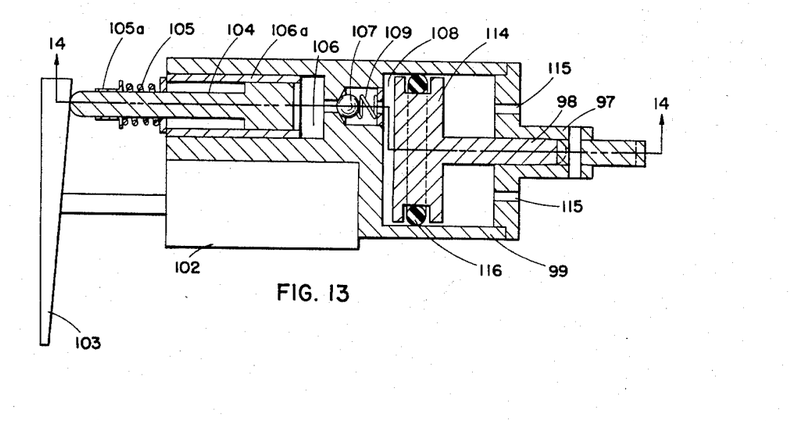
Fig. 13 shows the internal construction of a preferred type of power unit in partial section.
Figure 14:
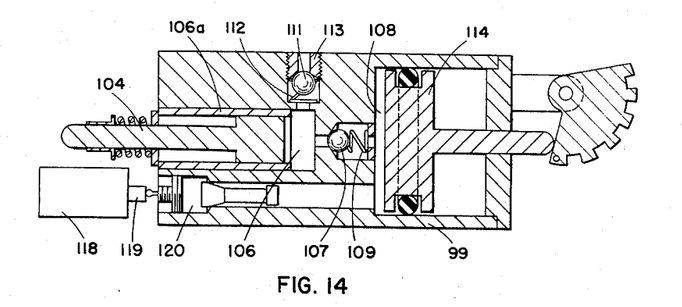
Fig. 14 shows a section of the same power unit taken at right angles to the section of Fig. 13 along line 14—14 of Fig. 13.

Referring to Figs. 13 and 14, the power supply means pictured in Figs. 2 and 12 is shown in partial section. Motor 102 is not sectioned because it is meant to represent any of the various types of small motor which may be employed. It would probably be a direct current motor in order to run on energy supplied by batteries. Motor 102 drives cam 103 which in turn produces reciprocation of driven piston member 104 which moves back and forth under the loading of spring 105. It will be noted that any means other than the motor and cam means shown may be substituted to produce the needed reciprocation of piston 104. Each stroke which decreases the size of chamber 106 and thereby compresses the fluid therein forces open ball type check valve 107 which lies between chamber 106 and chamber 108. When the pressure in chambers 106 and 108 is equalized, check valve 107 will close under the pressure of its spring 109. As the cam 103 permits, the volume of chamber 106 is again increased by forcing piston 104 back under pressure applied by spring 105. Because of the reduced pressure within cylinder 106, more fluid is permitted to enter chamber 106 through ball type check valve 111, normally held shut against shoulder 113 by the fluid and the pressure of spring 112. Again as cam 103 causes piston 104 to compress the fluid in chamber 106, the valve 107 opens and permits fluid to enter chamber 108, thereby causing the driving piston 114 to be driven forward, thus advancing output shaft 98. The advancing output shaft initiates hand movement as previously described. Vents 115 permit piston 114 to move freely without back pressure due to the compression of air behind piston 114. A resilient toroidal ring 116, commonly called an O-ring, may be used as sealing means between the piston 114 and the walls of chamber 108. In order to prevent overloading the mechanical parts forming the hand, overload valves to relieve dangerously high fluid pressures may be included in chamber 108.

When it is desired to open the hand, solenoid 118 may be excited in order to exert pressure on piston 119 which thereby opens check valve 120, which may be of the type used in penumatic tires, thereby releasing the pressure in chamber 108. Spring 100, or any other spring means positioned for the purpose, then causes the return of the hand to open position. It is possible to have a reverse drive mechanism causing the fingers to open by a process similar to that which causes them to close, but such a complication of drive mechanism is not necessary to produce a satisfactory hand.

It is, of course, possible to use various fluids to build up the necessary fluid pressure in my power supply means. These fluids may be either liquid or gaseous. It is convenient to use air because it requires no reservoir for the storage of fluid such as would be required by liquids or other gases. However, because of the great compressibility of gasses such as air, a liquid, such as some type of oil, might be preferred for the pressure transmitting medium.

Figure 15:
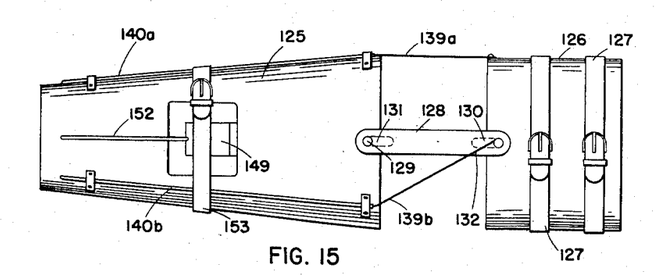
Fig. 15 shows in elevation a socket and support means to be used with my artificial hand for a lower arm amputee, said socket and support being in the extended arm position.
Figure 16:
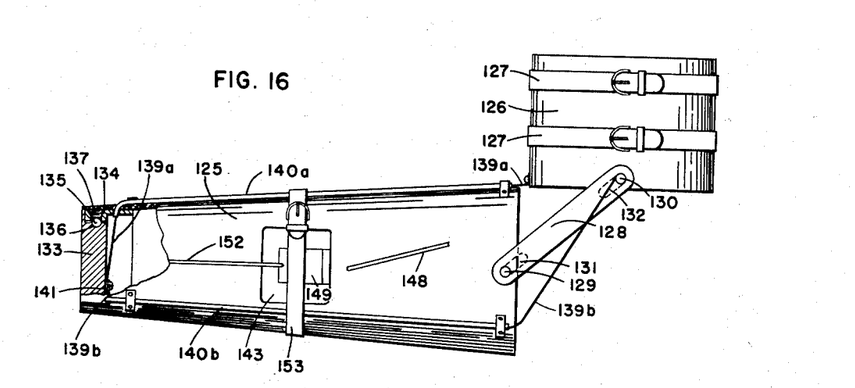
Fig. 16 shows in partial section the socket and support of Fig. 15 in the bent arm position.

Referring to Figs. 15 and 16, the support and socket apparatus for use with the artificial hand by the wrist or fore-arm level amputee are shown in elevation and in partial section respectively. The socket 125 is advantageously held in place by a flexible tubular support member 126 which fits around the upper arm and is held in place by means such as straps 127. The tubular support member 126 is advantageously connected to the socket 125 by means of strap members 128 on both sides of the arm adjacent the elbow joint. In order to insure a maximum of freedom, each strap member 128 is connected at one end to socket 125 by means of a pin 129 and at its other end to support member 126 by means of pin 130. In order to hold the socket 125 in place, the straps 128 should be able to expand or contract their lengths between pins 129 and 130. Hence they are advantageously made of rubber or similar material. The rubber may be reinforced by a metallic strip which has longitudinal slots 131 and 132 in which the pins move as the distance between them increases or decreases. The reinforcing metal is of great advantage to keep the socket in place where heavy pulls on the socket are expected.

Figures 17, 18:
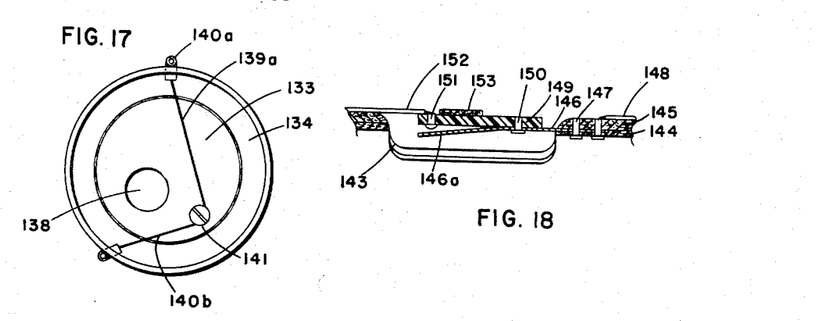
Fig. 17 shows in elevation the relatively rotatable portions of my artificial wrist.
Fig. 18 shows in partial section the switch element of the actuating circuit for my artificial hand.

Fig. 16, like Fig. 2, shows in cross section the wrist portion of the artificial hand which is also shown in a different and larger elevational view in Fig. 17. The wrist consists of a rotatable member 133, to which the artificial hand is affixed, and a stationary member 134, affixed to the socket 125. Member 133 is easily rotatable relative to member 134 because of ball bearings 135. Rotatable member 133 advantageously lies within stationary member 134. Ball bearings 135 advantageously run in a circumferential groove 136 around the rotatable member 133. These balls may be retained in place at the bottom of radial holes in stationary member 134 by means of screws 137. A hole 138 may be left in member 133 for solenoid 118.

The cables 139a and 139b each have one end affixed to the rotatable member 133 at some off-center position. It is usually convenient for the same off-center point to be used for both cables so that a single screw 141, or similar means, is sufficient to affix the ends in place. The otherwise unconnected end of one of the cables is attached to the upper arm above the elbow, close to the elbow. The otherwise unconnected end of the other cable is also attached to the upper arm close to the elbow but around the arm from the first cable. With a forearm amputation the arrangement illustrated in Figs. 15 and 16 makes it possible to affix that end of each cable adjacent the elbow to support member 126. Attachment to other members in this same region is also possible, of course. The cables 139a and 139b are advantageously surrounded by tubular members 140a and 140b which serve the dual purpose of shield and guide for the cables. The guiding function may be accomplished merely by affixing simple guide members such as loops in the same location in which the ends of the tubular members 140a and 140b would otherwise be fixed. A pair of guides should be fixed near the periphery of the stationary wrist member 134 or adjacent thereto on the support or socket 125. These guides should be widely spaced apart. Similarly spaced guides should be placed at the other end of the forearm adjacent the elbow. These guides may be affixed to socket member 125 in the case of a forearm amputation.

Rotation of the wrist occurs by means of the pull on the cables 139a and 139b which pass the socket 125 through tubular members 140a and 140b respectively on the way to the support member 126. The points on the socket at which the ends of tubular members 140a and 140b are affixed, the points at which the ends of cables 139a and 139b are affixed, and the movement of the wearer determine the amount of wrist movement produced. The end of the tubes 140a and 140b are fixed at widely spaced points around the socket 125 and the points of attachment of cables to the support 126 are also widely spaced. As the arm is bent at the elbow the distance between the point of affixing the end of each cable and the end of its tubular guide 140a or 140b will vary. In bending, this distance decreases for cable 139a and increases for cable 139b. In straightening, this distance increases for cable 139a and decreases for cable 139b. For smooth functioning of the wrist mechanism the sum of these distances for cable 139a and cable 139b should always be constant. This take up and release effect on the cables may be seen for two positions by reference to Figs. 15 and 16. It causes a pull on screw 141 resulting in rotation of rotatable member 133 which, of course, turns the whole hand. When the arm is bent, cable 139b will be under tension and cause a pull on screw 141 thus producing rotation in one direction. The further apart the near-wrist ends of tubular members 140a and 140b, the larger the angle through which the wrist may turn.

The further off-center the screw 141 is placed, the larger the lever arm presented to the pull of the cables 139a and 139b, hence the easier it is to turn the wrist. However, the closer to the center the screw is located, the less the movement of cables necessary to turn the wrist through any given angle. Unpredictable wrist movement is prevented by keeping the screw 141 within the smaller angle formed by the intersection at the axis of rotation of extensions of lines through said axis and through the ends of tubes 140a and 140b respectively.

The turning of the wrist produced by bending the elbow is particularly valuable when conveying objects to the mouth. This wrist movement is the one most frequently used and is hence most important to amputees.

Fig. 18 shows in cross section a switch used to actuate my artificial hand. The same switch is shown in elevation in Fig. 16 as mounted on socket 125. The switch is advantageously located within a thin walled depression 143 of the socket 125. Between the plys 144 and 145 of socket 125, which may be composed of leather or similar material, is sandwiched conductive strip 146, which is preferably made of spring material and held in place by rivets 147 or similar means. The conductive strip 146 may be directly connected to a circuit lead 148 or may be connected as shown through a rivet 147 or other conductor. Conductive strip 146 is affixed to dielectric block 149 by rivet 150 near one end of the block and has its unattached portion bent away (146a) from the block 149 toward the other end of the block. Metallic contact point 151 extends through this end of the block. When strip 146 is forced into contact with contact point 151, the actuating circuit, of which the switch is a part, is completed. The switch as a whole may be held in place by strap means 153 which encircle socket 125 and permit adjustment of the pressure with which the switches are held in place.

This type of switch is closed by pressure produced when muscles are flexed. Two such switches are used with my artificial hand, one to close the hand and the other to open it. Of course, the switch shown in Fig. 18 may be modified in order to take advantage of particular circumstances while retaining the basic idea of flexible metallic members which are closed against contact means by the flexing of a muscle.

In the case of wrist level amputations, by carefully selecting the location of the switches, natural muscle movements used in opening and closing the hand may be employed to close the respective switches and thus open and close the hand in a natural way. Thus, it is relatively easy to learn to use my artificial hand, although learning is still required in order to control the amount of pressure applied by the fingers. It is obvious, however, that even muscles not normally used in moving the hand may be used to produce movement of my artificial hand.

Figure 19:
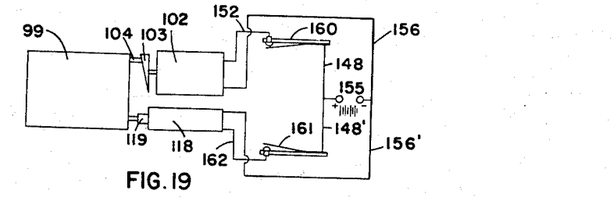
Fig. 19 shows schematically a circuit which may be employed in operating the power supply for my artificial hand.

A circuit of the sort illustrated schematically in Fig. 19 may be used to operate the artificial hand and produce movement therein. Energy may be supplied across terminals 155 by a battery which may be carried in any convenient manner anywhere on the body of the wearer. Since only a pair of leads is required to reach the battery, it seems unwise to add weight by including the battery in the arm. One lead from the battery is joined to leads 148 and 148', which lead through their respective switches 160 and 161 and thence through leads 152 and 162 to one side of the motor 102, or its equivalent, and one side of the solenoid 118, or its equivalent, respectively. The lead on the other side of the battery connects to the other side of the motor 102 and the other side of the solenoid 118 by leads 156 and 156' respectively.

Various elements of my artificial hand may also be used to advantage alone or in combination with other parts of my hand in other types of artificial hands. For instance, the digital units should be valuable with many types of hands now in common use. The fluid pressure power supply might be used to move other types of artificial hands. The wrist structure, in this connection, may be applied to almost any artificial hand.

It may also be noted that the construction of the digits suggested herein may be modified and used alone or with other parts of my invention to produce a grappling, scratching or similar means not necessarily classifiable as an artificial hand. Any such variations of my invention as described herein, used in simple or combined form, are within the scope of my invention.

I claim:

1. A fluid pressure power supply means for an artificial hand comprising a pair of chambers having volume varying means therein, the volume varying means in one of said chambers being a driven piston coupled to a reciprocating drive means and the volume varying means in the other chamber being a driving piston coupled to the power output means, an input check valve permitting fluid flow only into the chamber containing the driven piston, a check valve between the chambers permitting fluid flow only from the chamber containing the driven piston to the chamber containing the driving piston and a release valve permitting controlled discharge of fluid from the chamber containing the driving piston.

2. A fluid pressure power supply means for an artificial hand comprising a pair of adjacent chambers having volume varying means therein, the volume varying means in one of said chambers being a driven piston, the volume varying means in the other chamber being a driving piston, an input check valve permitting fluid flow only into the chamber containing the driven piston, a check valve between the chambers permitting fluid flow only from the chamber containing the driven piston into the chamber containing the driving piston, a release valve permitting controlled discharge of fluid from the chamber containing the driving piston, a motor driven means producing reciprocation coupled to the driven piston and suitable coupling means joining the driving piston to the hand mechanism load.

3. A fluid pressure power supply means for an artificial hand comprising a pair of adjacent chambers having volume varying pistons therein, the piston in one of said chambers being a driven piston and the piston in the other chamber being a driving piston, an input check valve permitting fluid flow only into the chamber containing the driven piston, a check valve between the chambers permitting fluid flow only from the chamber containing the driven piston into the chamber containing the driving piston, a release valve permitting controlled discharge of fluid from the chamber containing the driving piston, a motor cam-coupled to the driving piston and producing reciprocation thereof with the aid of spring loading opposing the cam drive, suitable output coupling means joining the driving piston to the hand mechanism load and a solenoid acting to release the release valve.

4. A fluid pressure power supply means for an artificial hand comprising a pair of chambers having volume varying pistons therein, the piston in one of said chambers being a driven piston and the piston in the other chamber being a driving piston, an input check valve permitting fluid flow only into the chamber containing the driven piston, a check valve between the chambers permitting fluid flow only from the chamber containing the driven piston into the chamber containing the driving piston, a motor cam-coupled to the driving piston and producing reciprocation thereof with the aid of spring loading opposing the cam drive, suitable output coupling means joining the driving piston to the hand mechanism load, a solenoid acting to release the release valve, and separate muscle actuated switches acting respectively to close the circuits supplying potential to the motor driving the cam and supplying potential to the solenoid.

5. A socket for support of an artificial hand comprising a sleeve shaped to receive the stump of the wearer's arm, flexible portions thereon above muscles which may be flexed, and switches mounted at said flexible portions in such a manner that they may be closed by the flexing of muscles, said switches closing circuits energizing respectively the means causing the hand to close and the means causing the hand to open.

6. A socket for support of an artificial hand comprising a sleeve shaped to receive the stump of the wearer's arm, flexible portions thereon above muscles which may be flexed, and switches consisting of a flexible member including a conductor and a contact against which the conductor in the flexible member may be forced, said switches being positioned in the flexible portions of the sleeve in such a manner that flexing of the muscle therebelow will cause the switch to close thereby energizing and causing movement of the artificial hand.

7. A means for holding an artificial hand in place for use with a socket supporting the hand mechanism and fitting over the stump of the wearer's lower arm comprising support means fitting around the wearer's arm above the elbow and connection means on both sides of the elbow joining said support means and the socket consisting of resilient straps between the socket and the support in combination with rigid elongated strips in each of which are slots elongated in the direction of elongation of the strip in each of which slots ride pin means affixed respectively to the socket and the support members.

8. A system for controlled actuation of a prosthetic device comprising a power supply including electrical means in combination with a fluid pressure force multiplying means for producing movement of said prosthetic device, an energy source, a circuit interconnecting the electrical means of the power supply and the energy source, said circuit including at least one switch member which controls the action of the power supply, said switch being so arranged that it may be operated by the flexing of a muscle of the wearer of the prosthetic device, and means for holding the switch in a position in which, when the prosthetic device is worn, the switch will be located relative to a muscle of said wearer in which the wearer will be able to operate it.

9. A system as described in claim 8 in which the holding means for maintaining the position of the switch relative to a muscle of the wearer is a portion of the socket which supports the prosthetic device on the wearer.

10. A system for controlled actuation of a prosthetic device comprising a power supply for producing movement of said prosthetic device, an energy source, and circuit interconnection between power supply and energy source, including a pair of switches which control the action of the power supply to produce movements in opposite directions, each of said switches being supported on the socket which supports the prosthetic device on the wearer in position relative to specific muscles of the wearer so that each of the switches may be operated by the flexing of a muscle of the wearer of the prosthetic device.

11. A system for controlled actuation of a prosthetic device comprising a fluid pressure force multiplying device, a motor which acts on the force multiplying device to produce an increase in fluid pressure, a solenoid which acts upon the force multiplying device to relieve pressure, an energy source, circuit interconnection means between the power supply and the motor, and circuit interconnection means between the power supply and the solenoid, each circuit interconnection means including a pair of switches which control the action of the power supply to produce movements in opposite directions, each of said switches being so arranged that it may be operated by the flexing of a muscle of the wearer of the prosthetic device, and means for holding each of the switches in a position which, when the prosthetic device is worn, will locate the switches relative to the respectively cooperating muscle of said wearer.

12. The system of claim 11 in which the solenoid acts upon the force multiplying device through a relief valve to relieve pressure and hence decrease the output force whereby one switch selectively operated by muscle action will increase the output force on the prosthetic device, and the other switch selectively operated by muscle action will reduce the output force on the prosthetic device.

References Cited in the file of this patent

UNITED STATES PATENTS

| | | |
|---|---|---|
| 2,528,464 | Wilkerson et al. | Oct. 31, 1950 |
| 2,640,994 | Alderson | June 9, 1953 |
| 2,701,370 | Alderson | Feb. 8, 1955 |